United States Patent
Dall'Occo et al.

(10) Patent No.: US 6,479,609 B1
(45) Date of Patent: Nov. 12, 2002

(54) MULTI-STAGE PROCESS FOR THE POLYMERIZATION OF OLEFINS

(75) Inventors: Tiziano Dall'Occo, Ferrara (IT); Giovanni Baruzzi, Ferrara (IT); Colin J. Schaverien, Amsterdam (NL)

(73) Assignee: Basell Technology Company BV, Hoofddorp (NL)

( * ) Notice: Subject to any disclaimer, the term of this patent is extended or adjusted under 35 U.S.C. 154(b) by 0 days.

(21) Appl. No.: 09/883,514

(22) Filed: Jun. 18, 2001

Related U.S. Application Data

(62) Division of application No. 09/265,036, filed on Mar. 9, 1999, now Pat. No. 6,262,195.

(30) Foreign Application Priority Data

Mar. 9, 1998 (EP) ............................................. 98200729

(51) Int. Cl.[7] .......................... C08F 110/02; C08F 4/42
(52) U.S. Cl. ...................... 526/352; 526/160; 526/943; 526/113; 526/82; 526/65; 525/53; 525/242; 525/247; 525/245; 525/248
(58) Field of Search ................................ 526/352, 160, 526/943, 113, 82, 65; 525/53, 242, 247, 245, 248

(56) References Cited

U.S. PATENT DOCUMENTS

| | | |
|---|---|---|
| 4,298,718 A | 11/1981 | Mayr et al. |
| 4,495,338 A | 1/1985 | Mayr et al. |
| 5,442,019 A | 8/1995 | Agapiou et al. |

FOREIGN PATENT DOCUMENTS

| | | | |
|---|---|---|---|
| EP | 0 128 045 A1 | 12/1984 | |
| EP | 0 361 493 A1 | 4/1990 | |
| EP | 0 361 494 A2 | 4/1990 | |
| EP | 0 362 705 A2 | 4/1990 | |
| EP | 0 395 083 A2 | 10/1990 | |
| EP | 0 436 328 A2 | 7/1991 | |
| EP | 0 451 645 A2 | 10/1991 | |
| EP | 0 514 594 A1 | 11/1992 | |
| EP | 0 553 805 A1 | 8/1993 | |
| EP | 0 553 806 A1 | 8/1993 | |
| EP | 0 575 875 A2 | 12/1993 | |
| EP | 0 619 325 A1 | 10/1994 | |
| EP | 0 673 950 A1 | 9/1995 | |
| EP | 0 705 851 A2 | 4/1996 | |
| WO | WO 95/35333 | 12/1995 | |
| WO | WO 96/02580 | 2/1996 | |
| WO | WO 96/02583 | 2/1996 | |
| WO | WO 96/07478 | 3/1996 | |
| WO | WO 96/09328 | 3/1996 | |
| WO | WO 96/11218 | * 4/1996 | |

* cited by examiner

*Primary Examiner*—David W. Wu
*Assistant Examiner*—Ling-Siu Choi
(74) *Attorney, Agent, or Firm*—Bryan Cave LLP

(57) ABSTRACT

A multi-stage process for preparing ethylene (co)polymers having broad molecular weight distributions is disclosed, said process comprising:

(A) a first polymerization stage in which, in the presence of a Ti or V catalyst, a first ethylene polymer is prepared;

(B) a treatment stage in which the catalyst used in the first stage is deactivated and in which a bridged bis-2-indenyl zirconocene is supported on the ethylene polymer produced in stage (A), optionally in the presence of a suitable cocatalyst; and (C) a second polymerization stage in which ethylene is polymerized in the presence of the product obtained from stage (B).

Furthermore, polyethylene obtainable by the above process is disclosed, having intrinsic viscosity ranging from 0.5 to 6 dl/g, Mw/Mn>8 and cold xylene solubility<1.2 % wt.

3 Claims, No Drawings

MULTI-STAGE PROCESS FOR THE POLYMERIZATION OF OLEFINS

This is a divisional of U.S. application Ser. No. 09/265, 036, filed Mar. 9, 1999 now U.S. Pat. No. 6,262,145 (Now allowed.)

FIELD OF THE INVENTION

The present invention relates to a multi-stage process for preparing ethylene homo and copolymers having broad molecular weight distributions and low content of soluble fractions, said process comprising a first polymerization stage (A) in the presence of Ti or V catalysts, a treatment stage (B) wherein the Ti or V catalyst is deactivated and a specific metallocene is supported on the polymer produced in stage (A), optionally in the presence of a suitable cocatalyst, and a final polymerization stage (C).

The invention also relates to the broad molecular weight distribution polyethylene obtainable by the above process.

PRIOR ART DISCLOSURE

Multistage processes for the polymerization of olefins, carried out in two or more reactors, are well known in the state of the art and are particularly interesting in industrial practice. Said processes are generally carried out using the same catalyst in the various stages/reactors, by utilizing tandem reactors operated in series: the product obtained in one reactor is usually discharged and sent directly to the following stage/reactor without altering the nature of the catalyst.

Broad or multi-modal molecular weight distribution (MWD) polyethylenes are commonly prepared by employing a multi-reactor process, wherein ethylene is polymerized in various reactors containing the same catalyst but in the presence of different concentrations of hydrogen, as molecular weight regulator. The thus obtained polymers contain a high molecular weight (HMW) fraction and a low molecular weight (LMW) fraction, therefore showing a broad total molecular weight distribution (MWD=Mw/Mn).

Nevertheless, said polymers present various drawbacks due to the LMW fraction obtained in the reactor with the higher amount of hydrogen; said fraction, having itself a broad MWD, contains undesired soluble products of very low molecular weight, which impair the mechanical properties of the final polymer and do not allow its use in medical and alimentary fields.

Polyolefins having broader MWD are products of notable commercial value, since they show high workability due to the HMW fractions and, at the same time, they provide excellent mechanical properties, due to the LMW fractions. Said polyolefins have been produced even in a single polymerization process, by employing two distinct and separate catalysts in the same reactor each producing a polyolefin having a different MWD. For instance, the European patent application EP 0 128 045 describe the use of a bimetallic catalyst system, i.e. a catalysts system comprising two or more metallocenes, each one having different propagation and termination rate constants, and alumoxanes; the polymers obtained by using said system in a single polymerization process have a broader multimodal molecular weight distribution than using a single metallocene, that usually produces polyethylenes with Mw/Mn of from 2 to 4; nevertheless, the obtained polymers have Mw/Mn lower than 8.

Also the European patent applications EP 0 619 325 and EP 0 705 851 describe the production of multimodal MWD polyolefin from a single polymerization process in the presence of a catalytic system comprising two different metallocenes, wherein at least one of the metallocenes is bridged, generally in the presence of hydrogen as MW regulator. The amount and productivity of the two metallocenes used is varied to control the relative amounts of the HMW and LMW fractions in the final polymer; nevertheless, these parameters are difficult to control and lead to non-homogeneous final products, not uniform in size, having unpredictable properties.

The European patent application EP 0 673 950 describes the preparation of polyethylene having a broad MWD in a gas phase reactor, in the presence of a prepolymer containing a Ti/Zr bimetallic catalyst and of hydrogen. The thus obtained polymers show very low Mn values and are obtained with low activities.

The European patent application EP 0 514 594 describes the production of polymers having multimodal molecular weight distribution in a single polymerization reactor wherein the catalytic system comprises a Mg support, a Ti or V based component, a zirconocene and suitable cocatalysts. Said catalytic system allows bimodal MWD polymers to be obtained; more specifically, the LMW polymer fraction is produced by the metallocene component, while the HMW fraction is due to the Ti or V component.

The several known methods employing mixtures of catalytic systems in one stage polymerization, as described above, have many drawbacks; in particular, the catalyst feed rate is difficult to control and the polymer particles produced are not uniform in size; segregation of the polymer during storage and transfer usually produce non-homogeneous products.

In order to overcome the above difficulties, various solutions have been proposed. The International patent application WO 96/07478 describe a single polymerization process carried out in the presence of a catalyst comprising two different transition metal compounds, each having different hydrogen response characteristics. The proportion of different weight fractions in broad or bimodal molecular weight distribution is controlled by adding a further amount of one of the two components of the bimetallic catalyst. Another solution is that disclosed in the International patent application WO 96/09328, wherein water and/or carbon dioxide are co-fed to the polymerization reactor, containing a bimetallic catalyst, at levels necessary to modify the weight fractions of the HMW and LMW components, thus achieving a target molecular weight distribution. However, the above solutions are still not satisfactory.

The International patent application WO 96/11218, in the name of the same Applicant, describes a multi-stage process for olefin polymerization, in particular for the preparation of heterophase copolymers of propylene, comprising a first stage wherein a first olefin polymer is prepared in the presence of titanium or vanadium catalysts; a second stage of deactivation of the catalyst used in the first stage; and a third stage of polymerization of one or more olefins in the presence of the polymer of the first stage and of a complex of a transition metal M (M being Ti, Zr, V or Hf) containing at least one M-π bond and/or of their reaction products. Said process proved to be particularly useful in the production of polymers with broad MWD, even if the metallocenes used did not allow a sufficiently low Mw to be obtained.

Therefore, it is desirable to provide a novel, high activity process for the production of broad MWD polyethylenes having low xylene soluble fractions, without incurring in the disadvantages of the above discussed prior art.

SUMMARY OF THE INVENTION

It has now been found that broad MWD ethylene homo and copolymers can be obtained through a multi-stage process, by using a new class of zirconocenes which are unexpectedly able to produce, in high yields, ethylene polymers having fairly low molecular weights and narrow MWD, without necessitating the use of molecular weight regulators, such as hydrogen.

More specifically, the present invention provides a multi-stage process for the polymerization of ethylene, optionally in the presence of one or more (x-olefins, comprising from 3 to 10 carbon atoms, to produce a polymer having a broad MWD; said process comprises the following stages:

(A) polymerizing ethylene, and optionally said α-olefin, in one or more reactors, in the presence of a catalyst comprising the reaction product between:
  (i) a solid component comprising a compound of a transition metal $M^I$ selected from Ti and V, not containing $M^I$-π bonds, and a halide of Mg in active form, optionally comprising an electron-donor compound (internal donor);
  (ii) an alkyl-Al compound and optionally an electron-donor compound (external donor);
in order to produce an ethylene homo or copolymer;

(B) contacting the product obtained in stage (A), in any order whatever, with:
  (a) a compound capable of deactivating the catalyst of stage (A);
  (b) a zirconocene compound of formula (1):

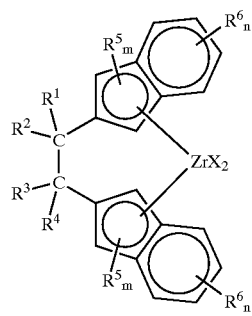

(I)

wherein $R^1$, $R^2$, $R^3$ and $R^4$, the same or different from each other, are selected from the group consisting of hydrogen, linear or branched, saturated or unsaturated, $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more Si or Ge atoms, or wherein two substituents of $R^1$, $R^2$, $R^3$ and $R^4$ form a ring having from 4 to 8 carbon atoms;

$R^5$ and $R^6$, the same or different from each other, are selected from the group consisting of linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more Si or Ge atoms, or wherein one pair of vicinal $R^6$ substituents of the same indenyl group forms a ring having from 4 to 8 carbon atoms;

m is an integer ranging from 0 to 2; n is an integer ranging from 0 to 4;

the groups X, the same or different from each other, are hydrogen, halogen, —R, —OR, —SR, —NR$_2$ or —PR$_2$, wherein R is selected from the group consisting of linear or branched, saturated or unsaturated, $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more Si or Ge atoms; and (c) optionally an activating cocatalyst;

(C) polymerizing ethylene and optionally said α-olefin, in one or more reactors, in the presence of the polymer obtained from stage (B).

Another object of the present invention are new polyethylenes obtainable according to the above multi-stage process, having broad MWD, average molecular weights of industrial interest and showing very low xylene soluble fractions. More specifically, the polyethylenes according to the present invention have the following characteristics:

1) intrinsic viscosity (I.V.) ranging from 0.5 to 6 dl/g, preferably from 1 to 4, and more preferably from 1.5 to 3 dl/g;

2) Mw/Mn (i.e. MWD)>8, preferably >10, and more preferably >11;

3) cold xylene soluble fraction XS<1.2% wt., preferably <1% wt., and more preferably <0.8 % wt.

The broad MWD polyethylenes of the present invention have good processability, while maintaining good mechanical properties.

DETAILED DESCRIPTION OF THE INVENTION

The multi-stage process for the polymerization of ethylene and optionally α-olefins, and the broad MWD polyethylenes thus obtainable, according to the present invention, will be better described in the following detailed description.

Stages (A)–(C) of the process of the invention are preferably carried out according to the operating conditions given in the cited International patent application WO 96/11218.

The first polymerization stage (A) allows the obtainment of a polymer fraction having high molecular weight, by using a conventional Ti or V-based catalytic system. Said stage (A) can be carried out in liquid phase or in gas phase, working in one or more reactors. The liquid phase can consist of an inert hydrocarbon solvent (suspension process), optionally in the presence of one or more α-olefins, comprising from 3 to 10 carbon atoms. Gas-phase polymerization can be carried out using the known fluidized-bed technique, according to standard procedures, or working in conditions in which the bed is mechanically stirred, optionally in the presence of one or more of said α-olefins.

The catalyst used in the first stage of polymerization (A) comprises the product of the reaction between.

(i) a solid component comprising a compound of a transition metal $M^I$ selected from Ti and V, not containing $M^I$-π bonds, supported on a halide of magnesium in active form, optionally comprising an electron-donor compound (internal donor);

(ii) an alkyl-Al compound and optionally an electron-donor compound (external donor).

Said halides of magnesium in active form, preferably MgCl$_2$, used as a support for Ziegler-Natta catalysts, are widely known from the patent literature. U.S. Pat. No. 4,298,718 and U.S. Pat. No. 4,495,338 first described the use of these compounds in Ziegler-Natta catalysis. It is well known that the halides of magnesium in active form, used as support or co-support in components of catalysts for the polymerization of olefins, are characterized by X-ray spectra in which the most intense diffraction line that appears in the spectrum of the non-active halide is diminished in intensity and is replaced by a halo whose maximum intensity is shifted towards lower angles compared with that of the most intense line.

The compound of the transition metal $M^I$ is selected preferably from the group consisting of halides of titanium, halogen-alcoholates of titanium, $VCl_3$, $VCl_4$, $VOCl_3$ and halogen-alcoholates of vanadium.

Among the titanium compounds, the preferred are $TiCl_4$, $TiCl_3$ and the halogen-alcoholates of formula $Ti(OR^1)_rX_s$, wherein $R^1$ is a $C_1$–$C_{12}$ hydrocarbon radical, or is a group —$COR^1$; X is halogen and (r+s) is equal to the oxidation state of Ti.

The catalytic component (i) is advantageously used in the form of spheroidal particles with mean diameter ranging from about 10 and 150 μm. Suitable methods for the preparation of said components in spherical form are reported for instance in European patent applications EP 0 395 083, EP 0 553 805, EP 0 553 806.

The internal donor optionally present in the catalytic component (i) can be an ether, an ester, preferably an ester of a polycarboxylic acid, an amine, a ketone; preferably, said internal donor is a 1–3,diether of the type described in European patent applications EP 0 361 493, EP 0 361 494, EP 0 362 705 and EP 0 451 645.

The alkyl-Al compound (ii) is preferably a trialkyl aluminum compound, such as triethyl-Al, triisobutyl-Al, tri-n-butyl-Al, tri-n-hexyl-Al, tri-n-octyl-Al and triisooctyl-Al. It is also possible to use mixtures of trialkyl-Al's with alkyl-Al halides, alkyl-Al hydrides or alkyl-Al sesquichlorides, such as $AlEt_2Cl$ and $Al_2Et_3Cl_3$.

The external donor present in the catalytic component (ii) can be the same or different from the internal donor. When the internal donor is an ester of a polycarboxylic acid, such as a phthalate, the external donor is preferably a silicon compound of formula $R"R"Si(OR")_2$, wherein the groups $R^{11}$, the same or different from each other, are $C_1$–$C_{18}$ alkyl, cycloalkyl or aryl radicals. Particularly advantageous examples of such silanes are methylcyclohexyldimethoxysilane, diphenyldimethoxysilane, methyl-t-butyldimethoxysilane and dicyclopentyldimethoxysilane.

The polymer obtained from the polymerization stage (A) has preferably a porosity, expressed as percentage of voids, higher than 5%, preferably higher than 10%, and more preferably higher than 15%. Said polymer is preferably characterized by macroporosity, wherein more than 40% of the porosity of the said polymers is due to pores with diameter higher than 10,000 Å; more preferably, more than 90% of the porosity is due to pores with diameter higher than 10,000 Å. The porosity, expressed as percentage of voids, and the distribution of pore radius are determined by absorption of mercury under pressure, according to the procedure reported in WO 96/11218.

The amount of polymer produced in the first stage of polymerization (A) is generally greater than 1000 g/g of solid component, preferably greater than 2000 g/g, more preferably greater than 3000 g/g. The amount of polymer produced in polymerization stage (A) is preferably between 10 and 90% by weight relative to the total amount of polymer produced in stages (A) and (C) and more preferably is between 20 and 80%. Stage (B) envisages, in any order whatever, the deactivation of the titanium-based catalyst used in stage. (A) and the supportation of the above specified zirconocene (I), and optionally of a suitable cocatalyst, on the polymer obtained in stage (A).

According to a preferred embodiment of the multi-stage process of the invention, in stage (B), the product obtained from stage (A) is first contacted with said compound (a) capable of deactivating the catalyst used in stage (A); then, the deactivated product thus obtained is contacted, in any order whatever, with said zirconocene compound (b) and optionally said activating cocatalyst (c). Preferably, after the treatment with the deactivating compound (a), any excess of the deactivating compound is removed, according to procedures known in the state of the art.

More specifically, stage (B)(a) comprises bringing into contact the polymer produced in polymerization stage (A) with compounds that are able to deactivate the catalyst used in said stage (A). The deactivation stage (B)(a) is necessary so as to avoid that the titanium based catalyst used in stage (A) is active in the polymerization stage (C), that would lead to the production of a too high molecular weight polymer, which would be unprocessable.

Stage (B)(b) comprises bringing into contact the product obtained in (a) with a zirconocene of formula (I), preferably a solution of the zirconocene of formula (I) in hydrocarbon solvents (benzene, toluene, heptane, hexane, liquid propane and the like), in order to support said zirconocene on the polymer obtained from stage (A).

Stage (B)(c), which can be carried out before, after or at the same time as (B)(b), comprises bringing into contact the product obtained in (a) with a suitable cocatalyst. Examples of compounds that can be used in treatment stage (a) can be selected from the group consisting of compounds having the general formula $R'''y_{-1}XH$, wherein R''' is hydrogen or a $C_1$–$C_{10}$ hydrocarbon group; X is O, N, or S; and y is the oxidation state of X. Non-limiting examples of such compounds are represented by alcohols, thioalcohols, mono- and di-alkylamines, $NH_3$, $H_2O$ and $H_2S$. Preferred compounds are those in which X is O and particularly preferred is water.

Other examples of compounds that can be used in treatment stage (B)(a) are CO, COS, $CS_2$, $CO_2$, $O_2$ and acetylenic or allenic compounds. The molar ratio between the deactivating compound and the compound of the transition metal $M^I$ should preferably be such as to ensure substantial deactivation of the catalyst of stage (A). The value of this ratio is preferably greater than 50, more preferably greater than 150 and in particular greater than 250.

Treatment (a), in which these deactivating compounds are brought into contact with the polymer produced in stage (A), can be effected in various ways. In one of these, the polymer is brought into contact, for a time ranging from 1 minute to some hours, with a hydrocarbon solvent that contains the deactivating compound in solution, suspension or dispersion. An example of dispersion of the deactivating compound in a hydrocarbon solvent is represented by humidified hexane. At the end of treatment (a), the liquid is removed and the polymer undergoes treatment (b).

In the zirconocenes of formula (I) used in stage (B)(b):

$R^1$, $R^2$, $R^3$ and $R^4$ are preferably selected from the group consisting of hydrogen, methyl, ethyl, propyl, phenyl and benzyl; more preferably, $R^1$, $R^2$, $R^3$ and $R^4$ are hydrogen and the bridging group of the 2-indenyls is ethylene;

$R^5$ and $R^6$ are preferably selected from the group consisting of methyl, ethyl, propyl, phenyl and benzyl;

the groups X are preferably selected from the group consisting of Cl, Br or methyl.

Non-limiting examples of zirconocene compounds belonging to the said class are:

1,2-ethylene-bis(2-indenyl)zirconium dichloride, 1,2-ethylene-bis(1,3-dimethyl-2-indenyl)zirconium dichloride, rac- and meso-1,2-ethylene-bis(1-methyl-2-indenyl) zirconium dichloride, rac- and meso-1,2-ethylene-bis(-ethyl-2-indenyl) zirconium dichloride, rac- and meso-1,2-ethylene-bis(4-phenyl-2-indenyl) zirconium dichloride and rac- and meso-1,2-ethylene-bis(1-methyl4-phenyl-2-indenyl)zirconium dichloride.

The zirconocene compounds of formula (I) can be prepared by reaction of the corresponding ligands first with a compound capable of forming a delocalized anion on the cyclopentadienyl ring, and then with a compound of formula $ZrZ_4$, wherein the substituents Z, the same or different from each other, are halogen; $ZrCl_4$ is particularly preferred.

When, in the zirconocene of formula (I) one or more X are other than halogen, it is necessary to substitute one or more substituents Z of the zirconocene dihalide with one or more substituents X other than halogen. The substitution in the zirconocene halide of Z with X other than halogen can be carried out by standard procedures, known in the state of the art, for example by reacting the zirconocene halide with alkylmagnesium halides (Grignard reagents) or with alkyl-lithium compounds.

The ligands useful to prepare the zirconocenes of the present invention can be synthesized by different procedures, and preferably as described in the European patent appl. no. 98200728.8 in the name of the same Applicant.

In stage (B)(c) of the process of the invention, suitable activating cocatalysts are organometallic aluminum compounds; particularly suitable are the organometallic aluminum compounds described in European patent application EP 0 575 875 (formula (II)) and those described in International patent application WO 96/02580 (formula (II)). Non-limiting examples of said organometallic aluminum compounds are: tris(methyl)aluminum, tris(isobutyl)aluminum, tris(isooctyl)aluminum bis(isobutyl)aluminum hydride, methyl-bis(isobutyl)aluminum, dimethyl(isobutyl) aluminum, tris(isohexyl)aluminum, tris(benzyl)aluminum, tris(tolyl)aluminum, tris(2,4,4-trimethylpentyl)aluminum, bis(2,4,4-trimethylpentyl)aluminum hydride, isobutyl-bis(2-phenyl-propyl)aluminum, diisobutyl-(2-phenyl-propyl) aluminum, isobutyl-bis(2,4,4-trimethyl-pentyl)aluminum and diisobutyl-(2,4,4-trimethyl-pentyl)aluminum.

The use of the above organometallic aluminum compounds is particularly advantageous when water is used, in stage (B)(a), as compound capable of deactivating the catalyst of stage (A).

The activating cocatalysts in stage (B)(c) of the process of the invention can even be the reaction product between water and one or more of the above-reported organometallic aluminum compounds.

Suitable activating cocatalysts in stage (B)(c) of the process according to the present invention are linear, branched or cyclic alumoxanes of formula:

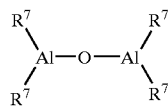

wherein the substituents $R^7$, the same or different from each other, are linear or branched, saturated or unsaturated, $C_2$–$C_{20}$ alkyl, cycloalkyl, aryl, arylalkyl or alkylaryl radicals, or are groups —O—Al($R^7$)$_2$.

Examples of alumoxanes suitable for use according to the present invention are methylalumoxane (MAO), tetra-isobutyl-alumoxane (TIBAO), tetra-2,4,4-trimethylpentyl-alumoxane (TIOAO) and tetra-2-methyl-pentylalumoxane. Mixtures of different alumoxanes can also be used.

Mixtures of different organometallic aluminum compounds and/or alumoxanes can also be used.

Further suitable activating cocatalysts in stage (B)(c) of the process of the invention are compounds capable of forming an alkyl zirconocene cation. Non-limiting examples are the compounds of formula $Y^+Z^-$, wherein $Y^+$ is a Bronsted acid, capable of donating a proton and of reacting irreversibly with a substituent X of the compound of formula (I), and $Z^-$ is a compatible non-coordinating anion, capable of stabilizing the active catalytic species originating from the reaction of the two compounds, and sufficiently labile to be displaced by an olefinic substrate. The $Z^-$ anion preferably comprises one or more boron atoms; more preferably, $Z^-$ is an anion of formula $BAr_4^{(-)}$, wherein the Ar substituents, the same or different from each other, are aryl radicals, such as phenyl, pentafluorophenyl and bis-(trifluoromethyl)phenyl. Tetrakis-pentafluorophenyl borate is particularly preferred. Moreover, compounds of formula $BAr_3$ can be advantageously used.

Treatment stage (B)(b) is preferably carried out using the zirconocene in solutions of hydrocarbon solvents containing a dissolved activating cocatalyst, according to stage (B)(c), which is preferably an alkyl-aluminum compound, such as triisobutyl-aluminum (TIBA), tris(2,4,4-trinethyl-pentyl) aluminum (TIOA) and/or an aluminoxane, for example methylalumoxane (MAO), tetra-isobutylalumoxane (TIBAO), tetra(2,5-dimethylhexyl)-alumoxane and tetra(2, 4,4-trimethyl-pentyl)alumoxane (TIOAO). The molar ratio of the alkyl-Al compound to the zirconocene is greater than 2 and is preferably between 5 and 1000. The stage (B)(b) can be carried out by suspending the polymer obtained from stage (B)(a) in hydrocarbon solvents, preferably propane, containing the dissolved zirconocene, and optionally an alkyl-Al compound and/or an aluminoxane (B)(c), generally working at temperature between 0 and 100° C., preferably between 10 and 60° C., and removing the solvent propane at the end of the treatment. Alternatively, the polymer obtained from (a) can be brought into contact, dry, with solutions of the zirconocene containing the minimum quantity of solvent for keeping the said compound in solution.

Stage (B) can be conveniently carried out in the gas phase in a loop reactor, in which the polymer produced in the first stage of polymerization is circulated by a stream of inert gas. Solutions of the deactivating compound and of the zirconocene are fed successively, for example using a sprayer, to the loop reactor in the gas phase, and a free-flowing product is obtained at the end of the treatment. Conveniently, before stage (b), the product is treated with compounds that are able to decontaminate the system, for example with alkyl-Al compounds.

The quantity of zirconocene, expressed as metal, contained in the product obtained from stage (B), can vary over a wide range depending on the zirconocene used and on the relative quantity of product that it is desired to produce in the various stages. Generally this quantity is between $1 \cdot 10^{-7}$ and $5 \cdot 10^{-3}$ g of Zr/g of product, preferably between $5 \cdot 10^{-7}$ and $5 \cdot 10^{-4}$, more preferably between $1 \cdot 10^{-6}$ and $1 \cdot 10^{-4}$.

The polymerization stage (C) can be carried out in liquid phase or in gas phase, working in one or more reactors, and it is directed to the synthesis of the low molecular weight polymer fraction. The liquid phase can consist of an inert hydrocarbon solvent (suspension process), optionally in the presence of one or more (α-olefins, comprising from 3 to 10 carbon atoms. Gas-phase polymerization can be carried out in reactors with a fluidized bed or with a mechanically-stirred bed, optionally in the presence of one or more of said α-olefins. During said stage (C), it is convenient to feed the polymerization reactor with an alkyl-Al compound selected from Al-trialkyls, wherein the alkyl groups contain from 1 to 12 carbon atoms, and linear or cyclic aluminoxane compounds containing —($R_7$)AlO—, wherein $R_7$ has the meaning reported above, said aluminoxane compounds containing from 1 to 50 repeating units. As a general rule, said alkyl-Al compound is fed to polymerization stage (C) when treatment (c) in stage (B) is absent.

The process of the invention allows the preparation of ethylene polymers having broad MWD, average molecular weights of industrial interest and low xylene soluble fractions. Therefore, another object of the present invention are broad MWD polyethylenes obtainable by the multi-stage process according to the present invention, said polyethylenes having the following characteristics:

1) intrinsic viscosity (I.V.) ranging from 0.5 to 6 dl/g, preferably from 1 to 4 dl/g, and more preferably from 1.5 to 3 dl/g;
2) molecular weight distribution Mw/Mn >8, preferably >10, and more preferably >11;
3) cold xylene solubility XS<1.2% wt., preferably<1% wt., and more preferably <0.8% wt.

Said polyethylenes, having a broad MWD, show very good processability properties and, at the same time, maintain excellent mechanical properties.

The following examples are reported for illustrative and not limiting purposes.

GENERAL PROCEDURES AND CHARACTERIZATIONS

All the operations with the catalytic systems, the metallocenes and the aluminum alkyls were carried out under nitrogen atmosphere.

All the polymerization solvents were used after drying over molecular sieves, deoxygenated and distilled over LiAlH$_4$ or aluminum tri-isobutyl; ethylene was used as polymerization grade reagent; 1-hexene was dried over alumina and distilled over LiAlH$_4$.

TIBAL (triisobutyl aluminum) was purchased from Witco and used as a 1M solution in hexane.

TIOA (tris-2,4,4-trimethyl-pentyl aluminum) was purchased from Witco and diluted to a 1M solution in heptane.

MAO (methyl alumoxane) was purchased from Witco as a 10% w/w solution in toluene; said solution was dried under vacuum, at 60° C., to obtain a white free-flowing powder. Said powder was solubilized in toluene (1M solution) before use.

The metallocenes and their intermediates were characterized by the following methods:

$^1$H-NMR and $^{13}$C-NMR

The $^1$H-NMR and $^{13}$C-NMR spectra were recorded in CD$_2$Cl$_2$ (referenced against the middle peak of the triplet of residual CHDCl$_2$ at 5.35 ppm) and C$_6$D$_6$ (referenced against residual C$_6$D$_5$H at 7.15 ppm), using a Varian Gemini 300 ($^1$H NMR at 300 MHz, $^{13}$C NMR at 75.4 MHz) or a Varian XL 200 ($^1$H NMR at 200 MHz, $^{13}$C NMR at 50.1 MHz). All NMR solvents were dried over 4 Å molecular sieves before use. Preparation of the samples was carried out under nitrogen, using standard inert atmosphere techniques; the measurements were performed at 20° C.

The polymers were characterized by the following methods:

INTRINSIC VISCOSITY (I.V.)

The measurement were done in tetrahydronaphtalene (THN) at 135° C.

DENSITY

The polymers density was determined by density gradient columns, according to ASTM D-1505.

XYLENE SOLUBILITY (XS)

Solubility in o-xylene at 25° C. was evaluated by solubilizing 2.5 g of the polymer under evaluation in 250 ml of o-xylene. The solubilization was carried out under nitrogen, at a temperature of 135° C., After 1 hour, the solution was cooled to 100° C. in air and then was cooled to 25° C. with a bath of water. After filtration, the solution was evaporated under nitrogen stream, on a plate heated at 140° C., thus obtaining the oxylene soluble polymer fraction at 25° C. Said fraction was dried in oven, in vacuum at 70° C., till the obtainment of a constant weight, and the obtained product was weighted.

SIZE EXCLUSION CROMATOGRAPHY (SEC)

Molecular weights Mn, Mw and Mz, and the molecular weight distribution (Mw/Mn) were determined by SEC analysis performed by using a "WATERS 200" GPC instrument working at 135° C. in 1,2-dichlorobenzene stabilized with BHT (2,6-di-t-butyl4-methyl-phenol) 0.1wt %.

MELT INDEX (MI)

Melt index values were measured at 190° C. following ASTM D-1238, over a load of 2.16 Kg (MI E) or 21.6 Kg (MI F). The melt flow ratio F/E represents the ratio MI F/MI E.

SYNTHESIS 1

1,2-ETHYLENE-BIS(2-INDENYL)ZIRCONIUM DICHLORIDE (a) Preparation of the Ligand 1,2-bis(2-indenyl)ethane Preparation of the Diethyl Ester of 2,5-Dibenzyl-adipic Acid from Diethyl Adipate

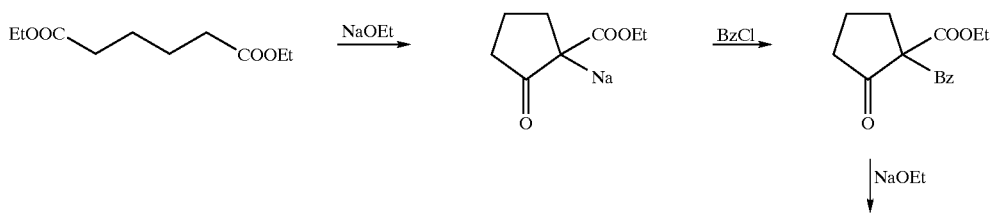

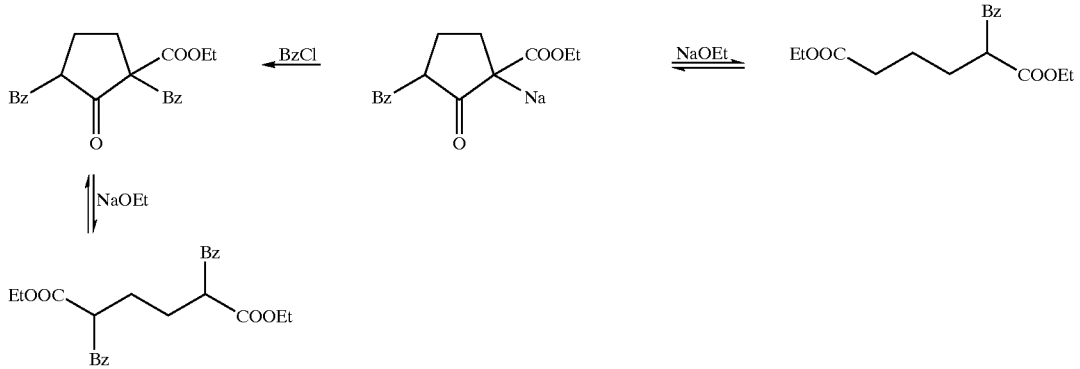

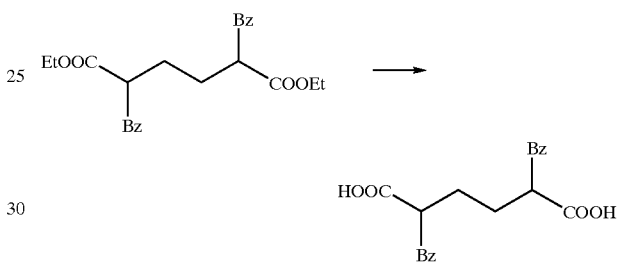

487 g of NaOEt (6.87 mol, 1.2 equivalents) were suspended in 3.54 kg of THF, in a 10 L cylindrical double-walled glass reactor, equipped with overhead stirrer and oil heating/cooling bath. The obtained suspension was heated to 60° C. and 1170 g (5.73 mol) of diethyl adipate were added, over a period of 1 hour.

The reaction mixture was stirred for 16 hours, at 60° C., and 820 g (6.41 moles, 1.12 equivalents) of benzyl chloride were added, over a period of 3.75 hours. The resulting product, the diethyl ester of 2-benzyl adipic acid, was maintained under stirring for other 3.5 hours, at 60° C., and the mixture was then allowed to cool to room temperature. 487 g (6.87 moles, 1.2 equivalents) of NaOEt were added to the mixture, over a period of 2 hours, at 23° C., and the reaction was then slowly warmed to 60° C., for 4 hours, and finally stirred for 16 hours at 60° C.

To the thus obtained mixture were then added 879 g (6.87 moles, 1.2 equivalents) of benzyl chloride, over a period of 1.75 hours. The reaction mixture was stirred at 65° C. for 6 hours and then cooled to 30° C.; an additional 100 g (1.47 moles) of NaOEt were added and, after 5 hours at 60° C., further 207 g (1.62 moles) of benzyl chloride were added, over a period of 1.75 hours, in order to convert the unreacted NaOEt into PhCH$_2$OEt. After 2 hours at 60° C., to the obtained mixture were added 224 g (4.87 moles, 0.85 equivalents) of EtOH and the reaction mixture was allowed to cool to 25° C. After the addition of 2,800 ml dilute HCl (pH 2), 1.43 kg toluene were added and the organic and aqueous layers were separated. The solvents were removed on a rotary evaporator and the higher boiling fractions (namely the excess of benzyl chloride and benzyl ether) were removed on a Schlenk line, at 100° C.

This purification procedure gave 2,035 g of dibenzyl adipate, having a purity of 95% (92% yield). $^1$H NMR (CDCl$_3$): δ 7.37–7.1 (m, 10H), 4.04 (q, 4H, CH$_2$), 2.9 (m, 2H), 2.7 (m, 2H), 2.6 (m, 2H), 1.65 (m, 2H), 1.55 (m, 2H), 1.13 (t, 3H, Me), 1.125 (t, 3H, Me). $^{13}$C NMR (CDCl$_3$): δ 174.8 and 176.26 (COOH, diastereomers), 138.86 (C), 128.6 (CH), 128.06 (CH), 126.06 (CH), 59.91 (CH$_2$), 47.17 and 46.88 (CH, diastereomers), 38.18 and 38.03 (CH$_2$, diastereomers), 29.28 and 29.18 (CH$_2$, diastereomers), 13.90 (Me).

De-esterification of the diethyl ester of 2,5-dibenzyl-adipic acid

In a 3 L 3-neck round bottom flask, equipped with an overhead stirrer, were added 723 g (1.89 moles) of diethyl ester of 2,5-dibenzyl-adipic acid, obtained as described above, and 910 ml (5.67 moles) of Claisen alkali solution (a 6.25M solution of KOH in a 1:3/H20:MeOH (v/v) mixture) and the obtained mixture was heated to 90° C. After 3 hours, the reaction mixture was cooled and transferred to a 2 L flask, and the MeOH removed on a rotary evaporator. The mixture was then washed with 800 mL ether, in order to remove organic impurities, and the obtained viscous water solution was poured into a 5 L beaker, diluted with 1 L water and cooled using an ice bath, to a temperature of about 10° C. To the solution, maintained under constant stirring, was slowly added concentrated HCl, always maintaining the temperature at about 10–15° C.

At a pH value of about 3, a copious white/beige powdery precipitate formed; concentrated HCl was added until a pH of 1 to 2 was reached, obtaining a final solution of about 4 L. The white precipitate was isolated by filtration and washed with 300 ml water, thus obtaining 2,5-dibenzyl-adipic acid as a powder. After drying in a vacuum oven (at 200 mmHg, under nitrogen stream, at 70° C.; to remove residual water) to constant weight, 598 g of pure 2,5-dibenzyl-adipic acid were isolated (yield 97% wt.).

$^1$H NMR (CD$_3$OD, 300 MHz): δ 7.10 (m, 10H, aromatic), 2.90 (m, 2H), 2.70 (m, 4H), 1.60 (m, 4H) ppm. $^1$H NMR (d$^8$-THF): δ 10.7 (br s, 2H, OH), 7.21–7.08 (m, 10H), 2.9 (dd, 2H), 2.62 (dd, 2H), 2.56 (m, 2H), 1.70 (m, 2H), 1.52 (m, 2H). $^{13}$C NMR (d$^8$-THF): δ 176.3 and 176.26 (COOH, diastereomers), 140.84 (C), 129.75 (CH), 128.88 (CH), 126.74 (CH), 47.94 and 47.82 (CH, diastereomers), 39.00 and 38.9 (CH$_2$, diastereomers), 30.33 and 30.36 (CH$_2$, diastereomers).

Preparation of 2,5-dibenzyl-adipic acid dichloride

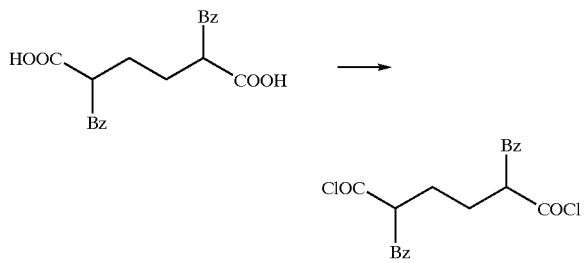

In a 2 L pear-shaped flask, were added 598 g (1.833 moles) of the 2,5-dibenzyl-adipic acid, prepared as described above, and 2,050 ml of $SOCl_2$ (17.22 mol, density=1.63 g/mL). The obtained mixture was stirred for 16 hours, at 20° C., and then heated at 55° C. for 7 hours, thus giving a homogeneous solution; a rapid but controlled gas evolution was observed.

After removal of $SOCl_2$ in excess, under vacuum at a bath temperature of 60° C., 300 mL toluene were first added and subsequently removed under vacuum, at 50° C., in order to remove any residual $SOCl_2$. A viscous light brown oil was isolated, which proved to be 2,5-dibenzyl-adipic acid dichloride (two diastereisomers were obtained).

$^1$H NMR ($CDCl_3$, 300 MHz): δ 7.4–7.2 (m, 8H, aromatic H), 3.14 (m, 4H), 2.87 (m, 2H), 1.80 (m, 4H) ppm. $^{13}$C NMR ($CDCl_3$, 75 MHz): δ 28.23 ($CH_2$), 28.33 (CH2), 37.48 ($CH_2$), 37.70 ($CH_2$), 58.43 (CH), 58.54 (CH), 127.3 (CH, aromatic), 128.95 (CH, aromatic), 129.06 (CH, aromatic), 137.1 (C), 176.15 (C=O) ppm.

Conversion of 2,5-dibenzyl-adipic acid dichloride to the corresponding bis(indanone)

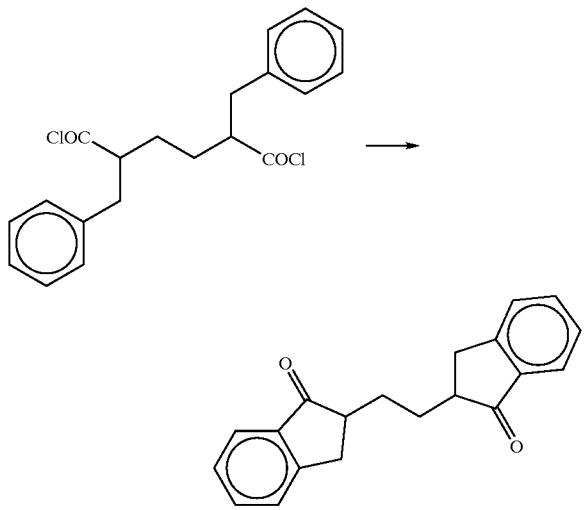

In a 3 L 3-neck flask, equipped with a large dropping funnel and kept under nitrogen, 605 g (4.53 moles; 24% excess) of $AlCl_3$ (99%, from Aldrich) were suspended in 800 mL of $CH_2Cl_2$, previously dried over molecular sieves; to the obtained suspension was slowly added, over a period of 3 hours, the 2,5-dibenzyl-adipic acid dichloride, prepared as described above, previously dissolved in 1200 ml of $CH_2Cl_2$. After stirring for 16 hours at 20° C., venting away the formed HCl, an orange suspension was obtained. This was carefully poured into a water/ice mixture, in a 5 L beaker, and the yellow $CH_2Cl_2$ layer was separated; the aqueous phase was extracted with 4×250 ml of $CH_2Cl_2$. The $CH_2Cl_2$ fractions were collected together and dried with anhydrous $MgSO_4$, thus obtaining a clear red-orange solution. Said solution was filtered and the solvent removed in vacuum, to afford a slightly sticky white solid. After washing with 500 ml pentane, 598 g of the bis(indanone) were isolated in the form of a white powder (yield 93% wt. from 2,5-dibenzyl-adipic acid).

$^1$H NMR ($CDCl_3$, 300 MHz): δ 7.7–7.3 (m, 8H, aromatic H), 3.3 (dd, 2H), 2.85 (m, 2H), 2.63 (m, 2H), 2.1 (m, 2H), 1.60 (m, 2H) ppm. $^{13}$C NMR ($CDCl_3$, 75 MHz): δ 28.6 ($CH_2$), 29.3 ($CH_2$), 32.47 ($CH_2$), 32.69 ($CH_2$), 46.94 (CH), 47.47 (CH), 123.9, 126.65 (CH, aromatic), 127.44 (CH), 134.85, 136.71, 153.78, 208.6 (C=O) ppm.

Conversion of the above bis(indanone) to the corresponding diol

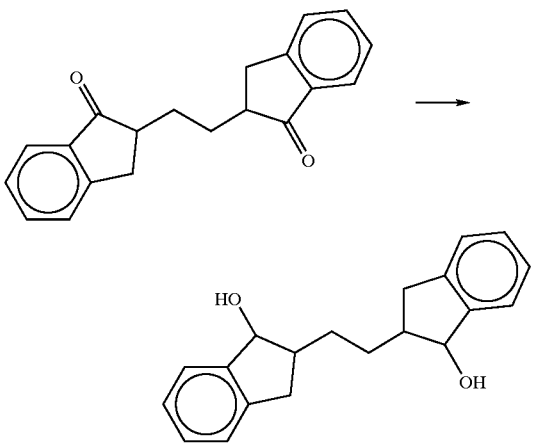

In a 5 L beaker, 494 g (1.70 moles) of the bis(indanone) prepared as described above were suspended in 3 L of THF and 1 L MeOH. After cooling the obtained mixture to about 10° C., with an ice bath, 71 g (1.87 moles) of $NaBH_4$ were slowly added, over a period of 3 hours, maintaining the suspension under vigorous stirring. The addition of $NaBH_4$ resulted in immediate gas evolution. The reaction mixture was maintained under stirring for 16 hours, at 20° C., and then THF and MeOH were removed on a rotary evaporator, thus giving a thick beige slurry. 2 L of water were added to said slurry and the obtained mixture was acidified with dilute HCl till a pH value of 3; a beige powder precipitated and was isolated by filtration. Said powder was extensively washed with water and finally dried to constant weight in a vacuum oven, at 75° C., finally obtaining 506 g of diol.

$^1$H NMR ($CDCl_3$, 300 MHz): δ 7.05–7.4 (m, 10H, aromatic), 5.13 (d, J=6), 5.05 (dd, J=6), 4.87 (d, J=6) total 2H, 3.1 (m), 2.9 (m), 2.75 (m), 2.5 (m), 2.4–2.1 (m), 2.0–1.6 (m) ppm.

Dehydration of the Diol to Give 1,2-bis(2-Indenyl)ethane 300g of the diol prepared as described above were placed in a 1 L 3 neck round-bottom flask, in a heating mantel; this was heated to a temperature of about 260° C., under nitrogen stream to remove water. The diol melted at about 190° C. The thermolysis was stopped after about 2 hours, thus obtaining a product in the form of a "melted glass"; to this product were added 500 ml of $CH_2Cl_2$, by stirring and scratching in order to solubilize said melted glass. The resulting mixture was filtered through a frit, thus isolating the insoluble product, that resulted to be 1,2-bis(2-indenyl) ethane. After washing with pentane, 33.7 g of 1,2-bis(2-indenyl)ethane with a purity of 98.95% (GLC analysis) was isolated, in the form of a white powder.

CH$_2$Cl$_2$ was removed under vacuum from the CH$_2$Cl$_2$-soluble fraction, to give a slightly oily orange powder. Said powder was washed with pentane to give 74.4 g of 1,2-bis (2-indenyl)ethane in the form of a 96% pure light beige powder.

Totally were isolated 108.1g of the desired ligand 1,2-bis (2-indenyl)ethane, with a 42% yield.

$^1$H NMR (CDCl$_3$): δ 7.5–7.1 (m, 4H), 6.63 (s, 1H), 3.39 (s, 2H, CH$_2$), 2.86 (s, 2H, CH$_2$). $^{13}$C NMR (CDCl$_3$): δ 150.1, 145.9, 143.4, 127.1, 126.7, 124.2, 123.8, 120.5, 41.5 (CH$_2$), 31.0 (CH$_2$).

(b) Preparation of the Zirconocene Dichloride

In a 2 L 3-necks round bottom flask, under nitrogen stream, to 146 g (0.566 moles) of 1,2-bis(2-indenyl)ethane was added 1 L Et$_2$O and the obtained mixture was cooled to −5° C. by means of a ice/salt bath. To this mixture were slowly added 475 ml of a 2.5 M n-BuLi solution in hexane (2.1 equivalents), over a period of about 2.5 hours. A beige slurry of the dianion was obtained. After having completed the addition, the mixture was stirred for a further 30 minutes, without ice bath, leading to a temperature of 14° C. The volume of the obtained solution was reduced to about 1 L, by removing the solvent under vacuum. This solution was then cooled to −78° C. and added to a suspension of 132 g (0.566 moles) of ZrCl$_4$ in 500 ml of CH$_2$Cl$_2$, in a 2L 3-necks round bottom flask, previously cooled to −78° C. A bright yellow suspension was rapidly obtained. Said suspension was allowed to warm slowly to 20° C. and was stirred for further 16 hours, at 20° C. The solvent was then removed under vacuum, to give a light yellow powder. The pure final product was separated from LiCl and from polymeric byproducts by Soxhlet extraction with CH$_2$Cl$_2$, thus obtaining 197 g of 1,2-ethylene-bis(2-indenyl)zirconium dichloride (yield of 83% wt.).

$^1$H NMR (C$_6$D$_6$): δ 7.5 (dd, 4H), 6.95 (dd, 4H), 5.85 (s, 4H), 2.52 (s, 4H). $^1$H NMR (CD$_2$Cl$_2$): δ 7.5 (dd, 4H), 7.15 (dd, 4H), 6.42 (s, 4H), 3.33 (s, 4H). $^{13}$C NMR (CD$_2$Cl$_2$): δ 140.6 (2C), 129.4 (4C), 126.1 (4CH), 125.5 (4CH), 103.1 (4CH), 31.1 (2CH$_2$). Elemental analysis: Calculated: C, 57.40; H, 3.85. Found: C, 57.29; H, 4.00.

SYNTHESIS 2

Rac- AND meso-1,2-ETHYLENE-BIS(1-METHYL-2-INDENYL) ZIRCONIUM DICHLORIDE (a) Preparation of the Ligand 1,2-bis(1-Methyl-2-indenyl) ethane 1.5 g (5.8 mmol) of 1,2-bis(2-indenyl)ethane, prepared as described in the above reported Synthesis 1(a), was dissolved in 25 ml THF and cooled to 0° C. n-BuLi (7.4 ml of a 1.6 M solution in hexane) was added and the resulting orange/brown solution stirred for 1 hour. This was added via a cannula to a solution of MeI (0.9 ml, 14.5 mmol) dissolved in 10 ml THF, at 0° C. After 2 hours, the THF was removed under vacuum and Et$_2$O was added. This Et$_2$O solution was washed 3 times with a saturated solution of NaHCO$_3$ and 3 times with a saturated aqueous solution of NaCl. After drying over MgSO$_4$, 1.4 g of yellow crystalline 1,2-ethylene-bis(1-methyl-2-indenyl)ethane was obtained. The ratio of double bond isomers is ca. 10:1. NMR data are reported for the major double bond isomer, i.e. the rac-isomer.

$^1$H NMR (CDCl$_3$): δ 7.45–7.10 (m, 8H), 6.53 (s, 2H), 3.43–3.30 (m, 2H, C$\underline{H}$Me), 2.90–2.60 (m. 4H, CH$_2$-bridge), 1.36 (d, 6H, 7.5 Hz, Me). $^{13}$C NMR (CDCl$_3$): δ 154.7 (C), 148.8 (C), 144.0 (C), 126.5 (CH), 124.8 (CH), 123.9 (CH), 122.5 (CH), 120.0 (=CH), 46.2 and 46.0 (asymmetric CHMe), 28.1 (CH$_2$-bridge), 15.8 (Me).

(b) Preparation of the Zirconocene 4.1 ml of a solution 2.5 M of n-BuLi in hexane were added to 1.4 g 1,2-ethylene-bis(1-methyl-2-indenyl)ethane, prepared as described above, in 50 ml Et2O cooled to 0° C. After 45 minutes, Et$_2$O was removed in vacuum and the resulting dianion was suspended in 80 ml toluene, at 20° C., in a drybox. 1.15 g (4.93 mmol) of ZrCl$_4$, in the form of a slurry in 10 ml toluene, were added and the reaction mixture changed from yellow to dark brown. After stirring for 21 hours at 20° C., the toluene solution was separated by centrifugation and the remaining solid was extracted with 3×25 ml toluene. The toluene extracts were combined, concentrated and crystallized at −35° C., thus giving 300 mg of rac-1,2ethylene-bis(1-methyl-2-indenyl)zirconium dichloride. The toluene-insoluble precipitate obtained from the reaction mixture was extracted with CH$_2$Cl$_2$; CH$_2$Cl$_2$ was removed in vacuum, thus giving a yellow powder. This was washed with 2×5 ml pentane to afford 230 mg of pure meso-1,2-ethylene-bis(1-methyl-2-indenyl)zirconium dichloride.

Rac-isomer:
$^1$H NMR (C$_6$D$_6$): δ 7.54–7.34 (m, 4H), 7.21–7.10 (m, 4H), 6.16 (s, 2H, =CH), 3.63–3.45 (m, 2H, CH$_2$ bridge), 3.20–3.03 (m, 2H, CH$_2$ bridge), 2.48 (s, 6H, Me). $^{13}$C NMR (CD$_2$Cl$_2$): δ 137.7 (C), 129.8 (C), 128.9 (C), 126.2 (CH), 125.6 (CH), 125.4 (CH), 123.5 (CH), 116.3 (C$\underline{C}$-Me), 97.9 (CH), 27.6 (C$\underline{H_2}$-bridge), 11.81 (Me). Elemental analysis: Calculated: C, 59.18; H, 4.51. Found: C, 58.94; H, 4.57.

Meso-isomer:
$^1$H NMR (C$_6$D$_6$): δ 7.54–7.46 (m, 2H), 7.41–7.33 (m, 2H), 7.24–7.06 (m, 4H), 6.71 (s, 2H, =CH), 3.55–3.25 (m, 4H, CH$_2$ bridge), 2.44 (s, 6H, Me). $^{13}$C NMR (CD$_2$Cl$_2$): δ 137.1 (C), 130.3 (C), 128.1 (C), 126.3 (CH), 125.8 (CH), 125.3 (CH), 123.6 (CH), 116.6 (C$\underline{C}$-Me), 101.0 (CH), 28.9 (C$\underline{H_2}$-bridge), 11.79 (Me).

EXAMPLES 1–7

Stage (A)

A 4.25 L stainless-steel autoclave, equipped with an helicoidal magnetic stirrer, temperature and pressure indicator, feeding lines for ethylene, propane, propylene and hydrogen, and a steel vial for the injection of the catalyst, was purified by flushing ethylene at 80° C. and washed with propane. In a Schlenk tube, under nitrogen atmosphere, at room temperature, were added 2 ml of a 1M hexane solution of triisobutylalurninium (2 mmoles), then 0.033 mmole of cyclohexyl-methyl-dimethoxy-silane and thereafter 20.3 mg of a solid catalytic component, prepared according to Example 3 of the European patent application EP 0 395 083 (Ti content, 1.96 wt. %). After 5 minutes aging, the content of the Schlenk tube was introduced into the autoclave in propane flow. The autoclave was closed and 125 g of propane and 20 g of propylene were introduced, slowly stirred for 45 minutes at 30° C., and for 45 minutes at 75° C. Finally, 280 g of propane, 7.2 bar partial pressure of ethylene and 1.8 bar partial pressure of hydrogen were added. By continuous stirring, a total pressure of 36.4 bar was maintained at 75° C., for 60 minutes, by feeding ethylene (320 g). At the end of the reaction, the reactor was depressurized; the polymerization conditions and the characterization data of the polymers obtained in the present stage are indicated in Table 1.

Stage (B)

To the polymer (300 g) obtained from stage (A) water was added and the obtained mixture was slurred, at 40° C., in 250 g of propane and stirred 30 minutes. This deactivation stage was followed by the injection of hexane solution of TIOA and of 1,2-ethylene-bis(2-indenyl)zirconium dichloride, obtained as described above, aged 5 minutes at room temperature, with a molar ratio Al/Zr of 500. The resulting slurry was stirred at 40° C. for further 10 minutes and propane was slowly flashed, under continuous stirring. The amounts of the used compounds are indicated in Table 2.

Stage (C)

Over a period of 5–10 minutes, the temperature was risen to 80° C. and the autoclave pressurized with ethylene under stirring. The total pressure was maintained for 137 minutes. The autoclave was rapidly degassed, flushed with nitrogen and opened, and the obtained polymer was completely dried in a oven at 60° C., under vacuum. The polymerization conditions and the characterization data of the polymers obtained in this stage are reported in Table 2. The characterization data of the final polymers are reported in Table 3.

EXAMPLE 8

The procedure described in Examples 1–7 was repeated, with the exception that, in stage (B), rac-1,2-ethylene-bis(1-methyl-2-indenyl)zirconium dichloride was used instead of ethylene-bis(2-indenyl)zirconium dichloride.

The polymerization conditions and the characterization data of the polymers obtained in the single stages are reported in Tables 1 and 2; the characterization data of the final polymer are reported in Table 3.

COMPARATIVE EXAMPLE A

The procedure described in Examples 1–7 was repeated, with the exception that no water was used in stage (B). The polymerization conditions and the characterization data of the polymers obtained in the single stages are reported in Tables 1 and 2; the characterization data of the final polymer are reported in Table 3.

The obtained results show the importance of the deactivation treatment (a) in stage (B). In fact, when no deactivation treatment is carried out, the titanium based catalyst remains active also in the polymerization stage (C), thus producing a considerable amount of undesirable polymer with a too high molecular weight. The final polymer has a very high MWD, as evidenced by the high value of the Mw/Mn ratio, but the average molecular weight Mw is too high and the polymer is thus unprocessable.

COMPARATIVE EXAMPLE B

The procedure described in Examples 1–7 was repeated, with the exception that in stage (B), rac-1,2-ethylene-bis(4,7-dimethyl-1-indenyl)zirconium dichloride was used instead of ethylene-bis(2-indenyl)zirconium dichloride. Rac-1,2-ethylene-bis(4,7-dimethyl-1-indenyl)zirconium dichloride was prepared as described in the International patent application WO 95/35333. Due to the low catalytic activity of the used zirconocene in polymerization stage (C), MAO was used in association with TIOA as cocatalyst. The polymerization conditions and the characterization data of the polymers obtained in the single stages are reported in Tables 1 and 2; characterization data of the fmal polymer are reported in Table 3.

From the obtained results, it is evident that zirconocenes other than the ones used in the process according to the present invention do not provide sufficiently low Mw, therefore leading to insufficiently broad MWD values.

TABLE 1

| | STAGE (A) | | | | | | | | | | | |
|---|---|---|---|---|---|---|---|---|---|---|---|---|
| Example | Ti cat. (mg) | TIBAL (mmol) | time (min) | $C_2H_4$ (bar) | $H_2$ (bar) | activity* (Kg/g-cat) | I. V. (dL/g) | MI E (g/10') | MI F (g/10') | F/E | Mw × $10^{-3}$ | Mw/Mn |
| 1 | 14.5 | 2 | 43 | 7.0 | 2.0 | 9.55 | 2.42 | 0.34 | 8 | 23.5 | 158 | 6.3 |
| 2 | 20.3 | 2 | 59 | 7.2 | 1.8 | 17.45 | 3.81 | 0.04 | 1.22 | 30.5 | 339 | 5.1 |
| 3 | 22.6 | 2 | 120 | 7.4 | 1.6 | 10.14 | 4.47 | n.d. | 0.66 | n.d. | 384 | 5.8 |
| 4 | 22.2 | 2 | 158 | 7.4 | 1.6 | 15.02 | 3.97 | n.d. | 0.8 | n.d. | 360 | 5.7 |
| 5 | 17.0 | 1.8 | 105 | 7.7 | 1.3 | 3.51 | n.d. | n.d. | n.d. | n.d. | — | — |
| 6 | 15.5 | 2 | 105 | 7.9 | 1.1 | 6.65 | 4.54 | n.d. | n.d. | n.d. | 444 | 6.4 |
| 7 | 15.5 | 1.8 | 43 | 7.9 | 1.1 | 14.2 | 4.80 | n.d. | n.d. | n.d. | 482 | 4.2 |
| 8 | 17.5 | 2 | 180 | 7.4 | 1.6 | 7.35 | 3.84 | n.d. | n.d. | n.d. | 310 | 6.6 |
| COMP. A | 26.6 | 2 | 27 | 7.0 | 2.0 | 5.21 | 4.02 | n.d. | n.d. | n.d. | — | — |
| COMP. B | 15.0 | 1.8 | 80 | 7.4 | 1.6 | 9.2 | 3.14 | 0.1 | 2.34 | 23.4 | 242 | 7.9 |

* = calculated
n.d. = not determinable

TABLE 2

| | STAGE (B) | | | STAGE (C) | | | |
|---|---|---|---|---|---|---|---|
| Example | $H_2O$ (mmol) | Zr-cene (mg) | TIOA (mmol) | $C_2H_4$ (bar) | time (min) | activity* (Kg/g-Zrcene) | I.V.* (dL/g) |
| 1 | 5 | 7.7 | 10 | 12 | 22 | 19.2 | 1.96 |
| 2 | 7 | 12 | 14 | 11 | 137 | 23.2 | 0.78 |
| 3 | 7 | 12 | 14 | 16 | 75 | 16.8 | 0.50 |
| 4 | 7 | 12 | 14 | 11 | 88 | 21.0 | 0.99 |
| 5 | 3.57 | 10 | 7.14 | 11 | 100 | 15.7 | 0.75 |
| 6 | 3.57 | 10 | 7.14 | 11 | 104 | 13.0 | 0.74 |
| 7 | 3.57 | 10 | 7.14 | 7 | 44 | 24.2 | 0.30 |

TABLE 2-continued

| | STAGE (B) | | | STAGE (C) | | | |
|---|---|---|---|---|---|---|---|
| Example | $H_2O$ (mmol) | Zr-cene (mg) | TIOA (mmol) | $C_2H_4$ (bar) | time (min) | activity* (Kg/g-Zrcene) | I.V.* (dL/g) |
| 8 | 3.57 | 8 | 7.14 | 2.8 | 71 | 23.3 | 0.89 |
| COMP. A | 0 | 5 | 5.95 | 11 | 26 | 36.2 | 9.81 |
| COMP. B | 5.25 | 10 | 9.45 + 1.5 MAO | 5 | 90 | 18.5 | 1.29 |

* = calculated on the basis of the split reported in Table 3, of the polymer produced and of the I.V. values obtained in stages (A) and (C)

TABLE 3

| | Final polymer | | | | | | | | | | |
|---|---|---|---|---|---|---|---|---|---|---|---|
| Example | yield (g) | split* (%) | I.V. (dl/g) | MI E (g/10') | MI F (g/10') | F/E | $Mn \times 10^{-3}$ (g/mol) | $Mw \times 10^{-3}$ (g/mol) | $Mz \times 10^{-3}$ (g/mol) | Mw/Mn | density (g/mol) | XS (% wt.) |
| 1 | 260 | 43:57 | 2.16 | 4.22 | 303.6 | 71.9 | 8.8 | 91 | 678 | 10.3 | — | 0.8 |
| 2 | 600 | 52:48 | 2.36 | 0.38 | 30.7 | 80.8 | 16.5 | 196 | 1211 | 11.9 | 0.9571 | 0.7 |
| 3 | 405 | 50:50 | 2.49 | 0.2 | 17.9 | 89.5 | 18.7 | 221 | 1351 | 11.8 | 0.9575 | 0.8 |
| 4 | 547 | 54:46 | 2.60 | 0.23 | 16.11 | 70.0 | 17.1 | 218 | 1353 | 12.7 | — | 0.61 |
| 5 | 274 | 43:57 | 1.93 | 0.93 | 90.24 | 97.0 | — | — | — | — | — | 0.64 |
| 6 | 206 | 37:63 | 2.14 | 0.57 | 70.3 | 123.3 | 9.9 | 184 | 1100 | 18.6 | — | 0.68 |
| 7 | 446 | 46:54 | 2.36 | 0.23 | 22.0 | 95.7 | 11.3 | 221 | 1253 | 19.6 | — | 0.5 |
| 8 | 290 | 36:64 | 1.94 | 0.91 | 76.0 | 83.5 | 11.6 | 168 | 963 | 14.5 | — | 0.75 |
| COMP. A | 285 | 36:64 | 7.7 | n.d. | n.d. | n.d. | 46.9 | 738 | 3735 | 15.7 | — | — |
| COMP. B | 286 | 35:65 | 1.94 | 0.33 | 18.5 | 33.5 | 23.7 | 157.8 | 692 | 6.7 | — | — |

*polymer stage (A): polymer stage (C)
n.d. = not determinable

What is claimed is:

1. A broad MWD polyethylene having the following characteristics:

i) intrinsic viscosity (I.V.) ranging from 0.5 to 6 dl/g;

ii) molecular weight distribution Mw/Mn>8; and iii) cold xylene solubility XS<1.2% wt., said polyethylene being obtained from a multi-stage process for the polymerization of ethylene, and optionally one or more a-olefins comprising from 3 to 10 carbon atoms, for producing a polymer having broad MWD, said process comprising the following stages:

(A) polymerizing ethylene, and optionally an α-olefin, in one or more reactors, in the presence of a catalyst comprising the reaction product between:

(i) a solid component comprising a compound of a transition metal $M^I$ selected from Ti and V, not containing $M^I$-π bonds, and a halide of Mg in active form, optionally further comprising an electron-donor compound (internal donor);

(ii) an alkyl-Al compound and optionally an electron-donor compound (external donor);

(B) contacting the product obtained in stage (A), in any order whatever, with:
(a) compound capable of deactivating the catalyst of stage (A);

(b) a zirconocene compound of formula (I):

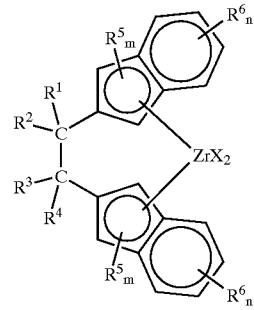

(I)

wherein $R^1$, $R^2$, $R^3$ and $R^4$, the same or different from each other, are selected from the group consisting of hydrogen, linear or branched, saturated or unsaturated, $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more Si or Ge atoms, or wherein two substituents of $R^1$, $R^2$, $R^3$ and $R^4$ form a ring having from 4 to 8 carbon atoms;

$R^5$ and $R^6$, the same or different from each other, are selected from the group consisting of linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more Si or Ge atoms, or wherein one pair of vicinal $R^6$ substituents of the same indenyl group forms a ring having from 4 to 8 carbon atoms;

m is an integer ranging from 0 to 2; n is an integer ranging from 0 to 4; the groups X, the same or different from each other, are hydrogen, halogen, —R, —OR, —SR, —NR$_2$ or —PR$_2$, wherein R is selected from the group consisting of linear or branched, saturated or unsaturated, $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more Si or Ge atoms; and (c) optionally an activating cocatalyst;

(C) polymerizing ethylene, and optionally an α-olefin, in one or more reactors, in the presence of the polymer obtained from stage (B).

2. The polyethylene according to claim 1 having the following characteristics:

i) intrinsic viscosity (I.V.) ranging from 1 to 4 dl/g;

ii) molecular weight distribution Mw/Mn>10; and iii) cold xylene solubility XS<1% wt.

3. The polyethylene according to claim 1 having the following characteristics:

i) intrinsic viscosity (I.V.) ranging from 1.5 to 3 dl/g;

ii) molecular weight distribution Mw/Mn>11; and iii) cold xylene solubility XS<0.8% wt.

* * * * *

UNITED STATES PATENT AND TRADEMARK OFFICE
CERTIFICATE OF CORRECTION

PATENT NO.   : 6,479,609 B1
DATED        : November 12, 2002
INVENTOR(S)  : Tiziano Dall'Occo It is certified that error appears in the above-identified patent and that said Letters Patent is hereby corrected as shown below:

<u>Column 19,</u>
Line 45, change "a-olefins" to -- α-olefins --.

Signed and Sealed this

Third Day of June, 2003

JAMES E. ROGAN
*Director of the United States Patent and Trademark Office*